(12) United States Patent
Van Berkel

(10) Patent No.: US 8,605,719 B2
(45) Date of Patent: Dec. 10, 2013

(54) CIRCUIT WITH NETWORK OF MESSAGE DISTRIBUTOR CIRCUITS

(75) Inventor: Cornelis H. Van Berkel, Heeze (NL)

(73) Assignee: ST-Ericsson SA, Plan-les-Ouates (CH)

( * ) Notice: Subject to any disclaimer, the term of this patent is extended or adjusted under 35 U.S.C. 154(b) by 655 days.

(21) Appl. No.: 12/452,643

(22) PCT Filed: Jul. 7, 2008

(86) PCT No.: PCT/IB2008/052728
§ 371 (c)(1),
(2), (4) Date: Jul. 26, 2010

(87) PCT Pub. No.: WO2009/010896
PCT Pub. Date: Jan. 22, 2009

(65) Prior Publication Data
US 2011/0044328 A1   Feb. 24, 2011

(30) Foreign Application Priority Data

Jul. 13, 2007 (EP) .................................. 07112419

(51) Int. Cl.
*H04L 12/50* (2006.01)
*H04Q 11/00* (2006.01)
*G06F 3/00* (2006.01)
*G06F 5/00* (2006.01)
*G06F 13/00* (2006.01)
*H04L 12/56* (2011.01)
*G06F 15/17* (2006.01)
*G06F 15/173* (2006.01)
*G06F 15/163* (2006.01)

(52) U.S. Cl.
CPC ............ *H04L 49/1507* (2013.01); *H04L 49/15* (2013.01); *H04L 49/10* (2013.01); *H04L 49/25* (2013.01); *H04L 49/101* (2013.01); *G06F 15/17* (2013.01); *G06F 15/173* (2013.01); *G06F 15/17356* (2013.01); *G06F 15/17393* (2013.01); *G06F 15/163* (2013.01)
USPC ............... 370/388; 370/387; 710/29; 710/36; 710/38; 710/52; 710/57

(58) Field of Classification Search
USPC ........ 370/386, 387, 388, 231; 710/29, 36, 38, 710/52, 57
See application file for complete search history.

(56) References Cited

U.S. PATENT DOCUMENTS 4,523,273 A * 6/1985 Adams et al. ................. 710/120
4,788,679 A * 11/1988 Kataoka et al. .............. 370/413

(Continued)

FOREIGN PATENT DOCUMENTS

EP           0 366 520 A1    5/1990

OTHER PUBLICATIONS

International Search Report dated Dec. 12, 2008 in connection with PCT Patent Application No. PCT/IB2008/052728.
David E. Culler, "Parallel Computer Architecture", 1999, p. 774-777 and p. 789-818.

(Continued)

*Primary Examiner* — Ayaz Sheikh
*Assistant Examiner* — Tarell Hampton
(74) *Attorney, Agent, or Firm* — Coats & Bennett, P.L.L.C.

(57) ABSTRACT

Source circuits (10) produce messages that may each be processed by any one of a plurality of processing circuits (14). A network of distributor circuits is provided between the source circuits and the processing circuits (14). Local decisions by the distributor circuits in the network decide for each message to which one of the processing circuits the message will be routed. Messages are supplied to at least two parallel distributor circuits. These distributor circuits (12a) select from further distributor circuits (12b) in the network on the basis of current availability of individual ones of the further distributor circuits (12b). The respective messages are in turn forwarded from the selected further distributor circuits (12b) to data processing circuits (14) along routes selected by the selected further distributor circuits (12b) on the basis of current availability of the data processing circuits (14) and/or subsequent distributor circuits (12c) in the network.

11 Claims, 3 Drawing Sheets

(56) References Cited

U.S. PATENT DOCUMENTS

| | | | |
|---|---|---|---|
| 5,146,564 A * | 9/1992 | Evans et al. | 710/57 |
| 5,239,653 A * | 8/1993 | Cubero-Castan et al. | 709/242 |
| 2005/0047405 A1* | 3/2005 | Denzel et al. | 370/388 |
| 2006/0165070 A1* | 7/2006 | Hall et al. | 370/369 |

OTHER PUBLICATIONS

Yucel Aydogan, et al., "Adaptive Source Routing in Multistage Interconnection Networks", Parallel Processing Symposium, Apr. 15, 1996, 10 pages.

* cited by examiner

CIRCUIT WITH NETWORK OF MESSAGE DISTRIBUTOR CIRCUITS

CROSS-REFERENCE TO RELATED APPLICATION(S)

The present application claims priority under 35 U.S.C. §365 International Patent Application No. PCT/IB2008/052728 filed Jul. 7, 2008, "CIRCUIT WITH NETWORK OF MESSAGE DISTRIBUTOR CIRCUIT". International Patent Application No. PCT/IB2008/052728 claims priority under 35 U.S.C. §365 and/or 35 U.S.C. §119(a) to European Patent Application No. 07112419.2 filed Jul. 13, 2007 and which are incorporated herein by reference into the present diclosure as if fully set forth herein.

FIELD OF THE INVENTION

The invention relates to a circuit comprising data producing sub-circuits coupled to a plurality of processing circuits, wherein the data producing sub-circuits produce messages, each message for processing by any one of the processing circuits.

BACKGROUND OF THE INVENTION

U.S. Pat. No. 6,173,259 describes a system wherein speech recognition tasks are produced from a plurality of terminals and processed by a plurality of processors. A server operates as a task distribution device that receives the tasks from the terminals, queues the tasks and distributes the tasks from the queues to the processors. Thus, the processors can be efficiently used because any processor may receive tasks generated by any terminal when it is free. The tasks can be evenly distributed over the processors, to minimize the delay before any task can start . . . .

The task distribution device may form a bottleneck in the operation of the system. When the task distribution device receives too many tasks simultaneously, the task distribution device could create a delay for accepting new tasks. For relatively big tasks, which take much more time to execute than to transmit to a processor this is hardly a problem, because the processors will block processing of new tasks before the server when there are many tasks. However in a highly distributed environment wherein small tasks are processed such a bottleneck can be significant. For example, in an integrated circuit wherein many small tasks are handled by small sub-circuits such a bottleneck could arise.

Various approaches may be used to solve this problem. In one approach each task source may be coupled to its own set of one or more processors. However, this results in inefficient use of processors for example when one task source produces many tasks and other task sources produce few tasks. In another approach a plurality of task distribution devices may be used in parallel. In a simple implementation each task distribution device is coupled to its own set of task sources and task processors. In this way the bottlenecks formed by each task distribution device can be limited, but the processors may still not be used optimally, for example when many tasks are handled by one task distribution device and few by other task distribution devices. To improve on this multiplexing circuits may be used that allow multiple task distribution devices to receive tasks from the same sources or to send tasks to the same processors. However, this reintroduces the risk of bottlenecks.

From the art of telecommunication it is known to route message that are addressed to specific destinations via alternative routes. The network selects between the alternative routes dependent on the availability of routers in the alternative routes. Eventually the messages are routed to the intended destination. Such systems do not work with messages that have no specific destination.

SUMMARY OF THE INVENTION

Among others it is an object to provide for a circuit with a plurality of task sources a plurality of task consumers wherein bottlenecks in the distribution of tasks are minimized.

In embodiments of the present invention, source circuits produce messages, each message for processing by any one of a plurality of processing circuits. A network of distributor circuits between the source circuits and the processing circuits is used to select the processing circuits to which the messages will be passed. The distributor circuits in the network each have a plurality of source side interfaces and a plurality of consumer side interfaces. They forward messages from the source side interfaces to the consumer side interfaces dependent on the current message handling ability at the consumer side interfaces.

As used herein "current ability" refers to a dynamically changing ability that depends on handling of previous messages.

The processing circuit that will ultimately receive a message depends on the selections made by the distributor circuits along the way. No predetermined processing circuit is associated with a message. This distinguishes from networks wherein messages addressed to specific destinations are routed along one of a number of alternative routes to the destinations of the messages. In an embodiment no addressing aimed at the network of distributor circuits is used in the message, in the sense that the distributor circuits are allowed to forward any message to any one of a plurality of processing circuits, whatever the content of the message. Also in an embodiment no predetermined source circuit-processing circuit relation is used for selection of consumer side interfaces.

The network of distributor circuits is configured so that not all source circuits are connected to the same distributor circuit at the input of the network, e.g. groups of source circuits are connected to different distributor circuits at the input of the network respectively. Furthermore the routes from source circuits to processing circuits each run through multiple distributor circuits, in a way that provides for paths to all of a set of processing circuits from each of a set of source circuits. By using such a network of distributor circuits instead of a single distributor circuit, the possibility of a complete bottleneck is avoided.

In an embodiment, a distributor circuit is realized that involves a minimum of circuit overhead. This makes it possible for example to use the distributor circuits at a fine grain level in an integrated circuit, wherein processing of individual messages takes little time.

In an embodiment the current ability to handle messages is determined by buffer memory circuits associated with the interfaces that generate requests to supply messages to the interface when there is free space for buffering messages. In this way a simple control mechanism is realized. In a further embodiment a buffer memory circuits is configured to generate requests only when it is empty, i.e. when they store no message that still needs to be transmitted. In this way a minimum number of messages is held up in the case of a bottleneck.

BRIEF DESCRIPTION OF THE DRAWING

These and other objects and advantageous aspects will become apparent from a description of exemplary embodiments, using the following figures

DETAILED DESCRIPTION OF EXEMPLARY EMBODIMENTS

Figure 1:
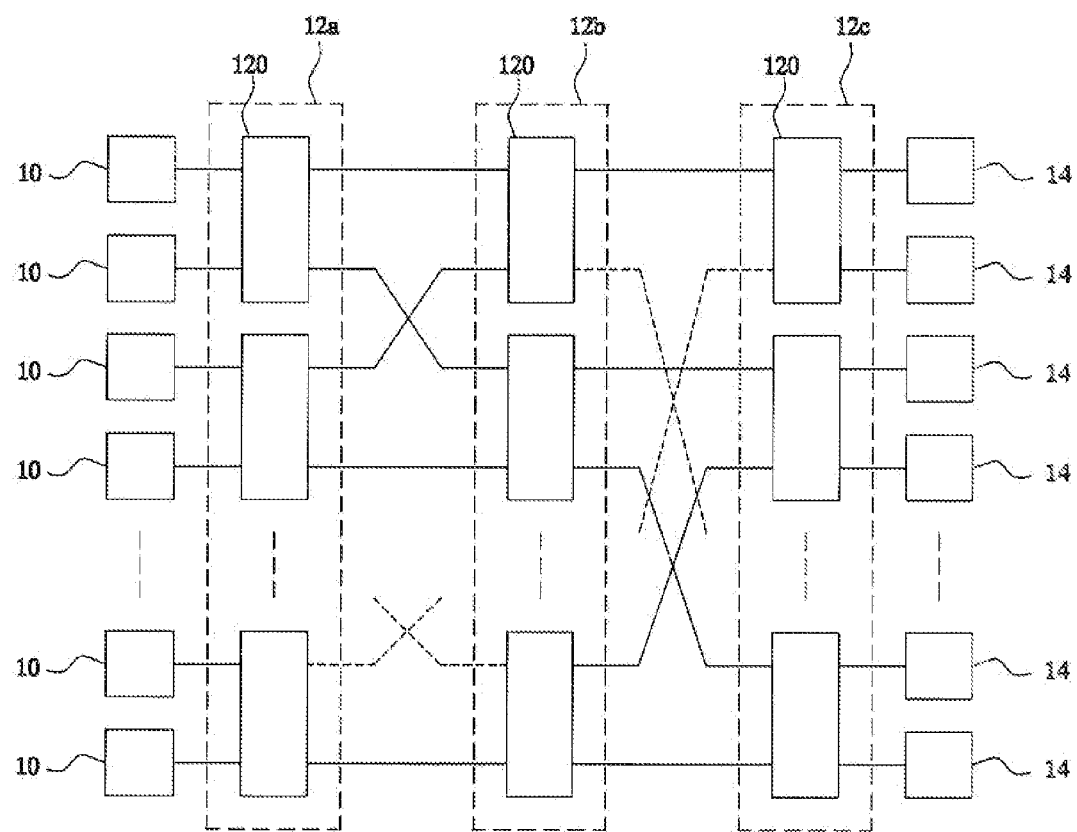
FIG. 1 shows a circuit

FIG. 1 shows a circuit, comprising a plurality of source circuits 10, a plurality of distributor layers 12a-c, each comprising a plurality of distributor circuits 120, and a plurality of processing circuits 14. By way of example a first distributor layer 12a, a second distributor layer 12b and a final distributor layer 12c are shown.

In operation the source circuits 10 produce messages. The source circuit may be circuits that produce the message data themselves, or they may pass messages generated by other circuits (not shown). Each source circuit 10 has a consumer-side interface coupled to a source-side interface of a respective one of the distributor circuits 120 in the first distributor layer 12a. The distributor circuits 120 in the first layer 12a each have a plurality of source-side interfaces, coupled to respective ones of the source circuits 10. Each distributor circuit 120 in the first distributor layer 12a has a plurality of consumer-side interfaces, coupled to source-side interfaces of respective ones of the distributor circuits 120 in the second distributor layer 12b. The distributor circuits 120 in the second layer 12b each have a plurality of source-side interfaces, coupled to respective ones of the distributor circuits 120 in the first layer 12a. Each distributor circuit 120 in the second distributor layer 12b has a plurality of consumer-side interfaces, coupled to source-side interfaces of respective ones of the distributor circuits 120 in the final distributor layer 12c. The distributor circuits 120 in the final layer 12c each have a plurality of source-side interfaces, coupled to respective ones of the distributor circuits 120 in the second layer 12b. Each distributor circuit 120 in the final distributor layer 12c has a plurality of consumer-side interfaces, coupled to source-side interfaces of respective ones of the processing circuits 14. The distributor circuits 120 are connected to distributor circuits 120 in other layers so that each processing circuit 14 can be reached from each source circuit 10 along a path of distributor circuits and their connected interfaces.

In operation source circuits 10 produce messages that are processed by processing circuits 14. Processing circuits 14 may be any circuit that uses information from messages. They may be programmable processors or any other type of circuit, including arithmetic circuits, such as adders for adding operands from messages, multipliers, multiplier-adders FFT butterfly processors etc. They may be logic circuits or memories that use information from the messages as logic input signals, or circuits that forward data from the messages to other circuits, without however performing distribution of messages between alternative destinations based on availability. The processing circuits do not act as distributor circuits, making no selection between alternative destinations either on the basis of current availability or on the basis of addresses. Part or all of the processing circuits 14 may also function as source circuit 10 that supply messages to the layers.

In principle, each message can be processed by any one processing circuit 14. The source circuits do not address messages to specific processing circuits 14. The messages may include information identifying the data, to allow for reassembly of related data obtained from different messages after processing.

The basic function of each distributor circuit 120 is to multiplex messages from its source side interfaces and to demultiplex these messages over its consumer side interfaces, accepting and distributing the messages based on the ability of other distributor circuits on its consumer side to accept messages. Within each layer each distributor circuit 120 handles only part of the message traffic that passes through the layer. The distributor circuits 120 in the first layer 12a are connected to distributor circuits 120 in other layers so that each processing circuit 14 can be reached from each source circuit 10.

It should be emphasized that a similar, although less optimal effect may be achieved even if not all source circuits 10 can be reached from each distributor circuit 120 in the first layer 12a. The layered network of FIG. 1 is only one example of a network of interconnected distributor circuits that can be used.

For example, a different number of layers may be used, depending on the number of source circuits 10, the number of processing circuit 14 and the number of interfaces provided in each distributor circuit 120. For example, the second distributor layer may be omitted. If it is omitted the consumer-side interfaces of the distributor circuit 120 in the first distributor layer 12b are connected to the source-side interfaces of respective ones of the distributor circuits 120 in the final distributor layer 12c. As another alterative, additional layers of distributor circuits 120 may be added between the second layer and the final layer.

Furthermore, the network does not necessarily need to have a structure that can strictly be divided into layers. Thus for example, a distributor circuit might have some source side interfaces connected directly to source circuits 10 and others coupled to source circuits via other distributor circuits. Furthermore, it is not necessary that messages from all source circuits can be sent to all processing circuits. Improved distribution is realized already if the network allows messages from two source circuits 10 that are connected to different distributor circuits 120 to be sent at least to selectable ones of the same plurality of processing circuits 14. In addition further processing circuits may be provided that can be reached with messages through the network from one of the two source circuits but not the other. In addition other source circuits may be provided from which the network can send messages to part or all of the plurality of processing circuits 14 that can be reached from the two source circuits.

Figure 1A:
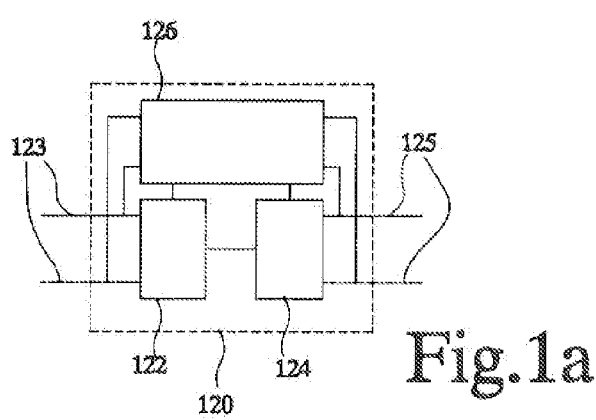
FIG. 1a shows a basic distributor circuit

FIG. 1a shows a basic distributor circuit 120, comprising a message multiplexer 122 for receiving and multiplexing messages from the source side interfaces 123, a message demultiplexer 124 for demultiplexing the multiplexed messages to the consumer side interfaces 125 and a control circuit 126 to control switching from reception from one source side interface to another and/or switching from transmission to one consumer side interface to another. In addition distributor circuit 120 preferably comprises one or more buffer memories for buffering the messages.

The control circuit 126 may be implemented as a dedicated hardware circuit or a programmable processor programmed to perform the required functions. In order to minimize overhead in the case of very fine grained distribution, a minimum sized dedicated hardware circuit is desirable. The control circuit 126 is configured to detect current availability of consumer side interfaces 125 for transmission of messages, to select currently available consumer side interfaces for transmission and to control transfer from the selected source side interfaces 123 to the consumer side interfaces 125. Furthermore the control circuit 126 is configured to indicate current availability to distributor circuits 120 on the source side of the distributor circuit. 120.Current availability may be determined for example from the current availability of any consumer side interface 125 and/or from the degree of buffer filling in the distributor circuit 120. The distributor circuit 120 adapts the route of the message to the next layer, or in case of the final layer to a specific processing circuit 14, based on availability of the distributor circuits 120 that are connected to it in the next layer, or on the availability of the processing circuits 14 after the final layer, preventing attempts to transmit messages to distributor circuits 120 or processing circuits 14 that are not available. Thus, blocking due to local congestion is circumvented.

It is desirable to apply a network of distributor circuits 12 at a fine grain message level, for example inside individual integrated circuits that also contain the source circuits 10 and the processing circuits 14. Fine grain means that a circuit is used where the source circuits 10 and the processing circuits 14 may be small and may require little time to produce and process individual messages. In such a fine grain circuit it is desirable that the network of distributor circuits 12 itself does not constitute a considerable circuit overhead. A minimally complex implementation is desirable. Such an implementation typically requires a message multiplexer 122 for incoming messages, a message demultiplexer 124 for outgoing messages(in some cases this may be realized by wiring only) and a control circuit 126 to control multiplexing and demultiplexing.

Preferably irrevocable message transmission request signals from the source side interfaces 123 and the consumer side interfaces 125 are used as inputs to the control circuit 126, the control circuit 126 signaling ability of the distributor circuit 120 to handle messages by acknowledgements of the requests. This simplifies the control circuit 126, although it has the disadvantage that at least one message may block before other distributor circuits 120 detect lack of current availability, so that they can choose different routes.

Furthermore, buffer memories are preferably used in the distributor circuit 120. In this case, request generation may be controlled using buffer status, generating a request when the buffer memory has free space for buffering a message. Without buffer memories, requests would have to propagate through the network, which requires additional resources and entails the risk of blocking. The buffer memories are preferably kept small, so that few messages and preferably only one message will be stuck in a memory when a distributor 120 blocks. Thus, the buffer memories serve more to facilitate control of distribution than to increase the ability to receive messages in a single distributor circuit 120.

In a further embodiment respective buffer memories are each associated with a respective interface between distributor circuits 120 or between a distributor circuit 120 and a source circuit 10 or processing circuit 14. In this way the buffer memories can be used to generate requests for message transmission along interfaces in a simple way based on the availability of a message in the buffer memory and the availability of space for a message in the buffer memory.

Figure 2:
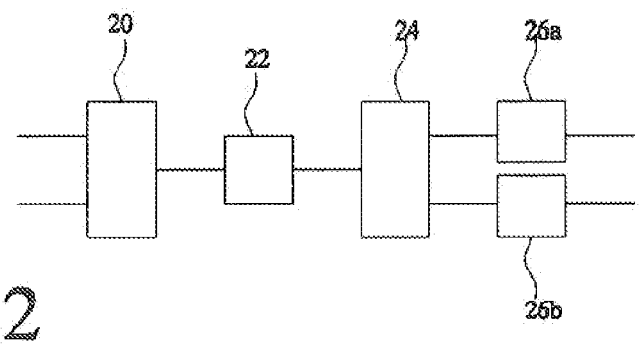
FIG. 2 shows a distributor circuit

FIG. 2 shows an embodiment of a distributor circuit 120. The embodiment comprises a handshake multiplexer 20, a handshake passivator 22, a handshake demultiplexer 24 and a first and second handshake buffer 26a,b. Handshake multiplexer 20 has source-side handshake interfaces coupled to the source-side interfaces of the distributor circuit 120 and a consumer-side handshake interface coupled to a first handshake interface of handshake passivator 22. Handshake demultiplexer 24 has a source-side handshake interface coupled to a second handshake interface of handshake passivator 22 and consumer side handshake interfaces coupled to source side handshake interfaces of first and second handshake buffer 26a,b. First and second handshake buffer 26a,b each has a consumer side handshake interface coupled to the consumer side interface of the distributor circuit 120.

Handshake multiplexer 20, handshake passivator 22, handshake demultiplexer 24 and first and second handshake buffer 26a,b are basic handshake components. Various circuit implementations may be used, among others dependent on the type of handshake signaling. In an embodiment synchronous handshake signaling is used, the time points of generating requests and acknowledgements being controlled by a clock signal that applies to the entire network of distributor circuits. Alternatively, asynchronous embodiments may be used. Well known examples of asynchronous handshake signaling are four phase voltage handshake signaling, wherein a request corresponds to a voltage pulse on a first signal conductor and an acknowledgment corresponds to a return voltage pulse on a second signal conductor, the return pulse starting after the start of the request pulse and the request pulse terminating after the start of the return pulse. Another example is two-phase voltage handshake signaling, wherein request and acknowledge correspond to voltage transitions of respective signal conductors. Many other forms of handshaking can be used, including signaling by means of currents, signaling requests and acknowledgements on a single conductor, mixtures of different forms of signaling etc. As will be appreciated for each form of signaling different circuit components are needed to perform the same function. Such components are known per se.

As can be appreciated this circuit multiplexes messages from its consumer side handshake interfaces onto a sequence of messages and demultiplexes this sequence by distributing the messages over the consumer side handshake interfaces. The handshake multiplexer 20 and demultiplexer 24 are constructed to respond to requests from their multi-terminal sides, i.e. the initiative for handshake transactions comes into the multi-terminal sides. If the initiative was the other way around this might give rise to blocking delays. The handshake passivator 22 couples handshake transactions from both sides. The handshake buffer 26a,b initiate the handshake transactions, based on whether they have available buffer space for a message. Thus, routing is controlled by freeing of the buffer space.

The function of handshake multiplexer 20 is that it forwards requests to supply messages from its source-side handshake interfaces to its consumer-side handshake interface, and returns acknowledgements from the consumer-side handshake interface to the originating source-side handshake interface. It arbitrates the sequence wherein request-acknowledgment handshake transactions started by the different source-side handshake interfaces will be performed if requests from different interfaces are pending at the same time. The function of handshake passivator 22 is that it converts requests to supply a message at one handshake interface to acknowledgments accompanying the message at the other handshake interface, upon receiving requests at that other handshake interface. The function of handshake demultiplexer 24 is to forward acknowledgements with accompanying messages from its source side handshake interface to that consumer-side interface that has received an as yet unsatisfied request.

Handshake buffers 26a,b each comprise a memory for storing a message. The function of the handshake buffers 26a,b is to issue requests at their source side handshake interface when the memory is free, storing the message when the request is acknowledged and to issue requests to supply the stored message at their consumer side handshake interface when a message is stored. Once the message has been supplied and the request acknowledged, the memory becomes free once more.

As will be realized the distributor circuit 120 of this figure directs messages to the memories of handshake buffers 26a,b. From these memories the messages are read. The distributor circuit 120 routes messages from any source side interface to the first or to the second handshake buffer 26a,b dependent on which of the handshake buffers 26a,b is available. When neither is available, the circuit stalls, in the sense that it cannot acknowledge a message from a handshake buffer of a preceding distributor circuit 120. As a result the preceding distributor circuit 120 will route newly supplied messages to its other handshake buffer or stall in turn. Recursively, the same goes for further preceding layers. In this way a distribution of messages within the layers is realized. A local bottleneck has the effect that messages no longer reach the bottleneck but are routed around it.

As may be noted handshake multiplexer 20, handshake passivator 22, handshake demultiplexer 24 form the core of the distributor circuit 120. First and second handshake buffer 26a,b may be associated with the links between distributor circuit 120, or with distributor circuits 120 at the other side of the links. First and second handshake buffer 26a,b may be designed with any buffer capacity. In an embodiment, they have buffer capacity for storing one message, with the result that they will request a new message only when completely free. In another embodiment they have capacity for N messages, enabling them to continue requesting messages as long as not N unread messages are buffered. However, in the case of a bottleneck this may mean that N messages have to wait for the resolution of the bottleneck, rather than being rerouted when the buffer is full. Therefore, it may be advantages to use small buffers, where N=1 or 2 for example.

Figure 3:
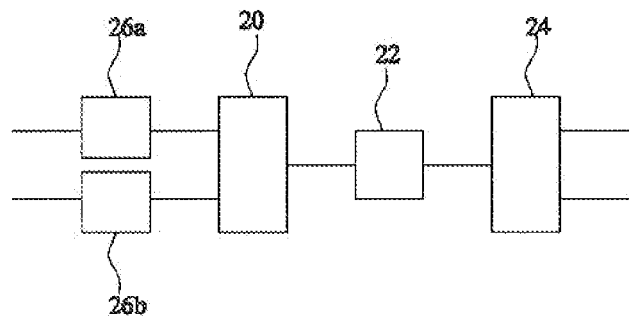
FIG. 3 shows an alternative distributor circuit

FIG. 3 shows an alternative implementation of a distributor circuit 120. In this implementation, the handshake buffers 26a,b have been associated with the source side of the distributor, before the handshake multiplexer 20, instead of at the back, after the handshake demultiplexer 24. The effect is that a distributor circuit 120 will receive messages on its own without first arbitrating, and transmit the messages to either consumer side handshake interface of handshake demultiplexer 24 dependent on the availability of the handshake buffers 26a,b in the next layers.

The implementations of FIGS. 2 and 3 may be termed a push distributor and a pull distributor respectively, because in FIG. 3 the handshake buffers 26a,b initiate requests to the preceding layer once they have become free due to requests from the following layer, whereas in FIG. 2 the handshake buffers 26a,b initiate requests to the following layer once they have stored a message from the preceding layer. In the implementation of FIG. 2, the handshake multiplexer 20 arbitrates between incoming requests from the preceding layer. In the implementation of FIG. 3, the handshake demultiplexer 24 arbitrates between incoming requests from the following layer. Preferably a "fair" arbitration scheme is used, which grants request from different interfaces alternately when requests are pending from both interfaces.

Figure 3A:
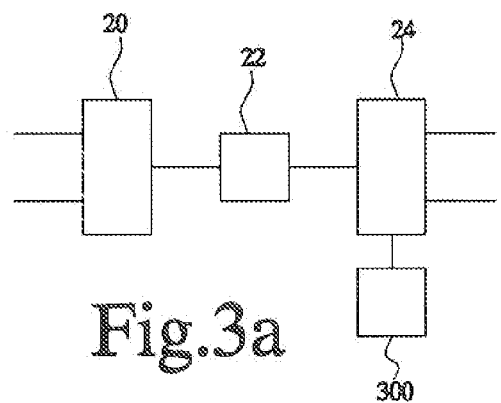
FIG. 3a shows a further distributor circuit

FIG. 3a shows a further distributor circuit wherein a selection memory 300 has been added, coupled to handshake demultiplexer 24. Handshake demultiplexer 24 is configured to store information about one or more previously selected consumer side handshake interfaces and to make subsequent selections between consumer side handshake interfaces based on this information. In an embodiment handshake demultiplexer 24 strives to maintain a continuous stream of messages to a consumer side handshake interface by each time selecting the consumer side handshake interface indicated by the information in selection memory 300, if it is available. In another embodiment, the messages contain identification information that identifies related messages. In this embodiment handshake demultiplexer 24 also stores the identification information from a previous message in selection memory 300. For a subsequent message handshake demultiplexer 24 selects the consumer side handshake interface indicated by the information in selection memory 300 for a previous message, if the identification information of the subsequent message matches the identification information stored for the previous message and it is available. Furthermore handshake demultiplexer 24 may be configured to avoid selecting the consumer side handshake interface indicated by the information in selection memory 300 for a previous message, if the identification information of the subsequent message does not match the identification information stored for the previous message and another consumer side handshake interface is available. By using at least one such distributor circuit in the network, streams of related messages tend to be formed.

Figure 4:
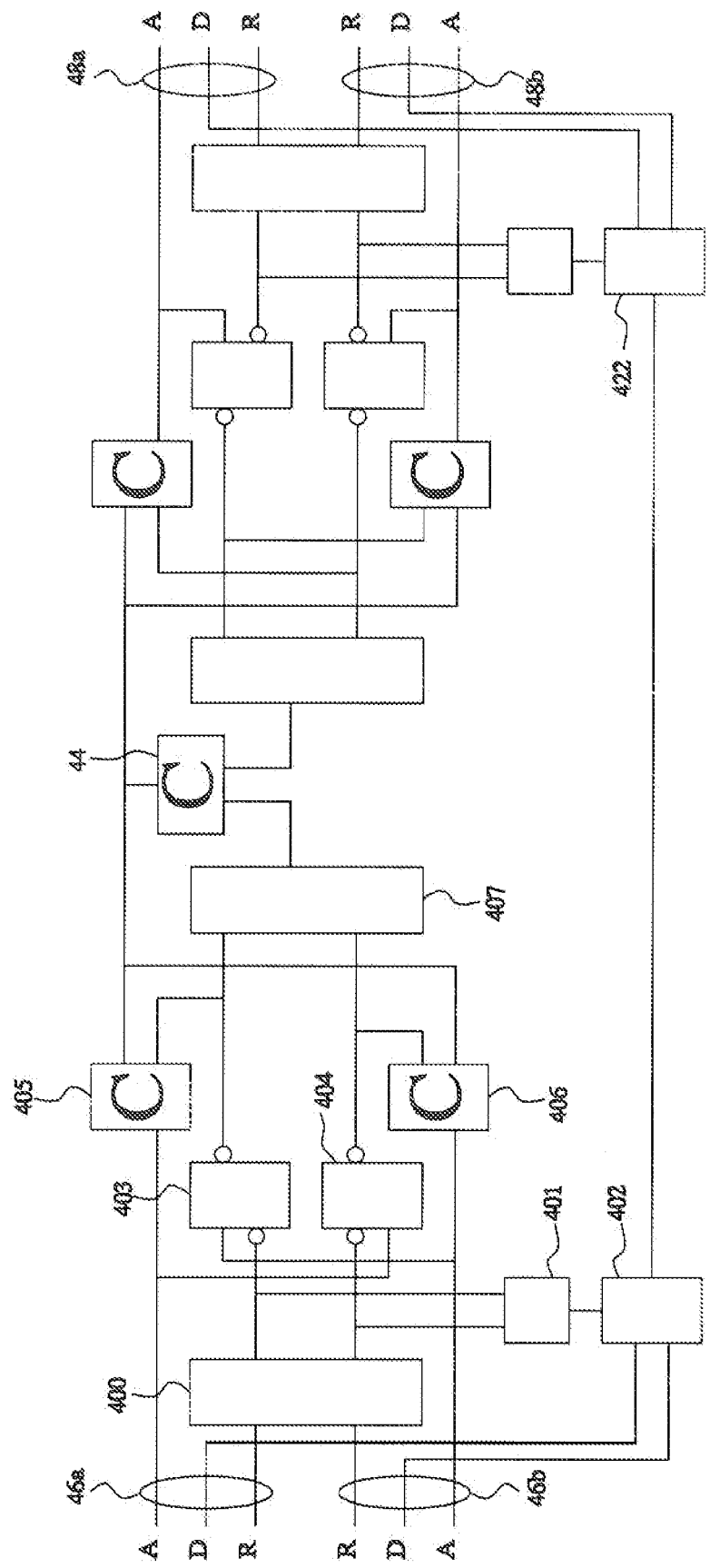
FIG. 4 shows part of a distributor circuit.

FIG. 4 shows an asynchronous embodiment of the handshake multiplexer, handshake passivator and handshake demultiplexer. In this embodiment the handshake multiplexer comprises a mutual exclusion circuit 400, with inputs coupled to the request signal conductors R of the source side interfaces 46a,b and outputs coupled to set and reset inputs of a set-reset latch 401, which has an output coupled to a control input of a data multiplexer 402. Data multiplexer 402 has data inputs coupled to the data conductors D of the source side interfaces 46a,b. Mutual exclusion circuits are known per se. Their function is to pass signals from their inputs to corresponding outputs, unless signals at both inputs are asserted, in which case they pass the signal from only one input, which may be any of the inputs.

Furthermore, the handshake multiplexer comprises a first and second Muller C elements 405, 406, and first, second and third OR circuits 403, 404, 407. The output of the third OR circuit 407 forms the consumer side interface request output of the handshake multiplexer. First inputs of first and second Muller C elements 405, 406 are coupled together and form the acknowledge signal input of the consumer side interface of the handshake multiplexer. The outputs of the first and second Muller C element form the acknowledge signal conductors A of the source side interfaces 46a,b. First and second OR circuits 403, 404 have first inputs coupled to the outputs of mutual exclusion circuit 400 and second inputs coupled to the outputs of the first and second and first Muller C element 405, 406 respectively. The outputs of first and second OR circuit 403, 404 are coupled to inputs of the first and second Muller C element 405, 406 respectively and to inputs of third OR circuit 407. First and second OR circuits 403, 404 are configured to perform a NOR(X, not Y) function, outputting a logic zero, unless they receive an asserted signal from the mutual exclusion circuit 400 and a not-asserted signal from the second and first Muller C element 405, 406 respectively.

In operation mutual exclusion circuit 400 passes one asserted request signal in response to a request at one of its inputs. First or second OR circuits 403, 405 passes such a request when no acknowledgment for the other input is asserted (or for any other input, when more than two inputs are used). Third OR circuit 407 signals a request when a request from any input has been passed.

The handshake demultiplexer is almost identical to the handshake multiplexer, except that is coupled to consumer side handshake interfaces 48a,b, that the source side and the consumer side are interchanged and that a de-multiplexer 422 (which may simply be a branching conductor) is used instead of a multiplexer 402. The passivator is implemented as a Muller C element 44, with inputs coupled to the outputs of third OR circuit 407 and its counterpart in the handshake demultiplexer. This Muller C element 44 has an output coupled to the inputs of the Muller C elements 405, 406 in the handshake multiplexer and their counterparts in the handshake demultiplexer.

In operation the passivator asserts its output signal when requests from the third OR circuits on both sides have been received. The Muller C element 405, 406 assert acknowledge signals when the passivator asserts its output signal and a request has been passed from the correspond input. The Muller C element 405, 406 deasserts it's acknowledge signal when the request signal is deasserted.

Figure 5:
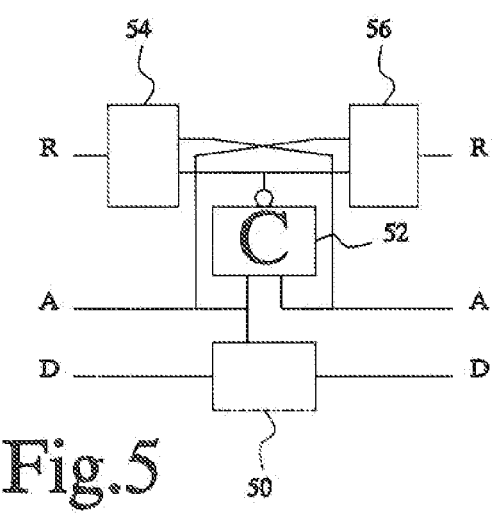
FIG. 5 shows a handshake buffer circuit

FIG. 5 shows a simplified handshake buffer, comprising a data latch 50, an inverting Muller C element 52 and a first and second logic circuit 54, 56. Data latch 50 is clocked by the output of inverting Muller C element 52, and receives and supplies message data from the source side and to the consumer side respectively. In addition, a reset circuit (not shown) may be provided for example in the form of a logic circuit that forces the effect of an acknowledgment in response to a reset signal. First and second logic circuits are used to form request signals for the source side and consumer side interface, as the AND of the output signal of the inverting Muller C element 52 and the acknowledge signal from the consumer side and as the NOR of the output signal of the inverting Muller C element 52 and the acknowledge signal from the source side respectively. The acknowledge signal conductors from the source and consumer side are coupled to the inputs of the inverting Muller C element 52.

In a synchronous implementation of the circuit, the Muller C elements may be replaced by a synchronous equivalent. The other components may be simplified. Replacement of handshake circuits by synchronous circuits in general is discussed in an article titled "Synchronous Handshake Circuits" by Ad Peeters and Kees van Berkel, in the Proceedings of the 7th International Symposium on Asynchronous Circuits and Systems, 2001 page 86 ISBN:0-7695-1034-5.

As will be appreciated, the use of handshake multiplexers and demultiplexers with two consumer or source side interfaces is shown by way of example. Different numbers may be used. When one interface is used, the handshake multiplexer or demultiplexer may be omitted altogether. This may be done for example in the first layer 12a or the final layer 12c.

Furthermore, it should be appreciated that a simple embodiment has been described wherein all processing circuits 14 can be reached from any source circuit 10 from a set of source circuits 10 and all processing circuits 14 from a set of processing circuits 14 can process all messages. However, additional source circuits 10 may be added from which only part of the processing circuits 14 can be reached. Similarly, additional processing circuits 14 may be added that can be reached only from part of the source circuits 10.

Furthermore specialized processing circuits 14 may be used that are able to process only part of the messages. In this case routing of messages of unsuitable type to these processing circuits 14 should be avoided. In this case the selected distributor circuits 120 may be adapted to forward messages that require a particular capability only to other consumer-side interfaces of the distributor circuits 120 that are known to be coupled to at least one processing circuit 14 with this capability. This may be realized for example by testing the message type in the handshake demultiplexer 24 before accepting a handshake request from an interface, and acknowledging that request from that interface only if it is known that at least one processing circuit14 capable of processing this type of message is coupled to the interface. Processing circuits 14 that do not have a particular capability may be grouped and connected to the distributor circuit 120 so that a selected consumer-side interface of a selected distributor circuit 120 is coupled only to processing circuits 14 without this particular capability. In this case the selected distributor circuits 120 is configured to prevent forwarding messages that require this particular capability to the selected interface.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A circuit comprising:
   a plurality of processing circuits, each configured to process messages;
   a plurality of source circuits, each configured to generate the messages, each of said messages can be processed by any one of said plurality of processing circuits; and
   a network coupled between the plurality of processing circuits and the plurality of source circuit operative to select by which of the processing circuits the messages will be processed, the network comprising a plurality of distributor circuits, each distributor circuit having a plurality of source side interfaces and a plurality of consumer side interfaces, each distributor circuit being configured to select over which of the consumer side interfaces messages from the source side interfaces will be transmitted towards the processor circuits, based at least partly on signals from the consumer side interfaces that indicate a current ability to forward the messages via the consumer side interfaces and not based on the content of the message;
   wherein said source circuits are coupled to source side interfaces of a first plurality of the distributor circuits in the network and said processing circuits are coupled to consumer side interfaces of a second plurality of distributor circuits in the network, the consumer side interfaces of the distributor circuits in the first plurality being coupled directly or indirectly to the source side interfaces of the distributor circuits in the second plurality, with a connectivity such that at least two of the source circuits that are coupled to different ones of the distributor circuits in the first plurality are both coupled to all of said plurality of processing circuits via the distributor circuits of the second plurality; and
   wherein the circuit comprises first buffer memory circuits coupled to respective ones of the source side interfaces of the at least one of the distributor circuits, each first buffer memory circuit being configured to generate requests to supply messages to the source side of the distributor circuit dependent on whether the first buffer memory circuit has buffered one of the messages.

2. A circuit according to claim 1, wherein at least one of the distributor circuits comprises
- a multiplexing circuit with an output and with inputs coupled to the source side interfaces of the distributor circuit;
- a demultiplexing circuit with an input coupled to the output of the multiplexing circuit and with outputs coupled to the consumer side interfaces of the distributor circuit; and
- a control circuit configured to detect the requests to supply messages via the outputs of the demultiplexer for transmission to the consumer side interfaces, and to control selection between the inputs of the multiplexing circuit for supplying messages to the input of the demultiplexing circuit based on the requests received from the source side interfaces.

3. A circuit according to claim 2, comprising second buffer memory circuits coupled to respective ones of the consumer side interfaces of the at least one of the distributor circuits, each second buffer memory circuit being configured to generate the requests to receive the messages from the output of the demultiplexing circuit dependent on whether the second buffer memory circuit has free space for storing one of the messages.

4. A circuit according to claim 3, wherein each second buffer memory circuit is configured to generate the requests only when the second buffer memory circuit stores no message that still needs to be forwarded.

5. A circuit according to claim 2, wherein the at least one of the distributor circuits has asynchronous handshake interfaces coupled to the source side interfaces and the consumer side interfaces for receiving and acknowledging the requests asynchronously.

6. A circuit according to claim 1, wherein at least one of the distributor circuits comprises a third memory for storing information indicating previously selected consumer side interfaces, the at least one of the distributor circuits being configured to select, for at least part of the messages, the consumer side interfaces over which said part of the messages will be transmitted based at least partly on said information, said at least part of the messages being transmitted to the consumer side interfaces indicated by said information when the consumer side interfaces are currently able to forward the messages.

7. A circuit according to claim 1, wherein the consumer side interfaces of the distributor circuits in the first plurality are coupled to the source side interfaces of the distributor circuits in the second plurality, so that at all of the source circuits that are coupled to different ones of the distributor circuits in the first plurality are coupled to all of said plurality of processing circuits via the distributor circuits of the network.

8. A circuit according to claim 1, wherein the source side interfaces of the first plurality of the distributor circuits are coupled only to said source circuits and not to further ones of the distributor circuits.

9. A circuit according to claim 1, wherein the consumer side interfaces of the second plurality of the distributor circuits are coupled only to said processing circuits and not to further ones of the distributor circuits.

10. A method of processing data, the method comprising:
- generating messages each operative to be processed by any one of a plurality of processing circuits;
- supplying respective messages to at least two different distributor circuits in a network of distributor circuits;
- selecting, in the at least two different distributor circuits, from further distributor circuits in the network of distributor circuits on the basis of current availability of individual ones of the further distributor circuits and without regard to the content of any message;
- forwarding the respective messages from the at least two different distributor circuits to the selected further distributor circuits;
- forwarding the respective messages from the selected further distributor circuits to data processing circuits along routes selected locally in the network by the selected further distributor circuits on the basis of current availability of the data processing circuits and/or subsequent distributor circuits in the network and without regard to the content of any message, wherein
- connectivity of interfaces between distributor circuits in the network provide for routes to any one of a plurality of the processing circuits, selected by means of a combination of the selections made at at least the at least two different distributor circuits and the further distributor circuits;
- providing buffer memory circuits, each associated with a respective interfaces between distributor circuits of the network; and
- generating requests dependent on the buffer memory circuits occupation.

11. A method according to claim 10, the method comprising:
- multiplexing incoming messages in each of the distributor circuit into a respective sequence of messages;
- demultiplexing the messages in each of the distributor circuits from the sequence circuit to respective consumer side interfaces; and
- controlling the demultiplexing circuit based on the requests received from the consumer side interfaces.

* * * * *